United States Patent
Chauvelon et al.

(10) Patent No.: US 6,800,754 B1
(45) Date of Patent: Oct. 5, 2004

(54) METHOD FOR PRODUCING CELLULOSE SULFOACETATE DERIVATIVES AND PRODUCTS AND MIXTURES THEREOF

(75) Inventors: Gaelle Chauvelon, Saint Georges sur Loire (FR); Luc Saulnier, Nantes (FR); Alain Buleon, La Chapelle sur Erdre (FR); Jean-Francois Thibault, Orvault (FR)

(73) Assignee: Institut National de la Recherche Agronomique (INRA), Paris (FR)

( * ) Notice: Subject to any disclaimer, the term of this patent is extended or adjusted under 35 U.S.C. 154(b) by 0 days.

(21) Appl. No.: 09/890,348

(22) PCT Filed: Jan. 28, 2000

(86) PCT No.: PCT/FR00/00205

§ 371 (c)(1),
(2), (4) Date: Mar. 4, 2002

(87) PCT Pub. No.: WO00/44791

PCT Pub. Date: Aug. 3, 2000

(30) Foreign Application Priority Data

Jan. 29, 1999 (FR) ............................................ 99 01049

(51) Int. Cl.⁷ ............................................... C07H 11/00
(52) U.S. Cl. ......................... 536/124; 536/32; 536/33; 536/59; 536/1.11; 536/123.1; 536/69
(58) Field of Search ............................. 536/32, 33, 59, 536/69, 124

(56) References Cited

U.S. PATENT DOCUMENTS 3,075,962 A * 1/1963 Hiatt ........................ 260/215
3,075,963 A   1/1963 Hiatt et al.
4,005,251 A * 1/1977 Tunc ........................... 536/59

FOREIGN PATENT DOCUMENTS

GB          1 177 480         1/1970

OTHER PUBLICATIONS

Tanghe et al, "Methods in Carbohydrate Chemistry", 1963. vol. III, 193–195.*
Araki, V. T. "Acetylation of Cellulose, I. The Mechanism of Aceylation and The Properties of The Intermediate Products", Journal of the Society of Chemical Industry, 1940, vol. 48 (2), 99 49B–52B, English Translation.*
Ott et al., Derivatives of Cellulose"cellulose and cellulose derivatives part II", *Internscience Publishers Inc., 1963*, pp. 775–777 XP002115074.
B.I. Aikhodzhaev et al., Preparation and study of the Properties of Primary Soluble Cellulose Acetates with Low Degree of Substitution, *Chemical Abstracts*, vol. 97, No. 10, Sep. 6, 1982, pp. 1317–1321 XP002115075.

* cited by examiner

*Primary Examiner*—James O. Wilson
*Assistant Examiner*—Ganapathy Krishnan
(74) *Attorney, Agent, or Firm*—Young & Thompson

(57) ABSTRACT

A method for directly producing a mixture of cellulose sulfoacetate derivatives by esterification of cellulosic material, characterized in that it comprises the following steps i) the cellulosic material is suspended in a glacial acetic acid solution and the excess acetic acid is eliminated ii) the cellulosic acid that is swollen with acetic acid is suspended in a sulfuric acid solution in glacial acetic acid and iii) the cellulose material is made to react by adding acetic anhydride.

17 Claims, 1 Drawing Sheet

Figure 1:
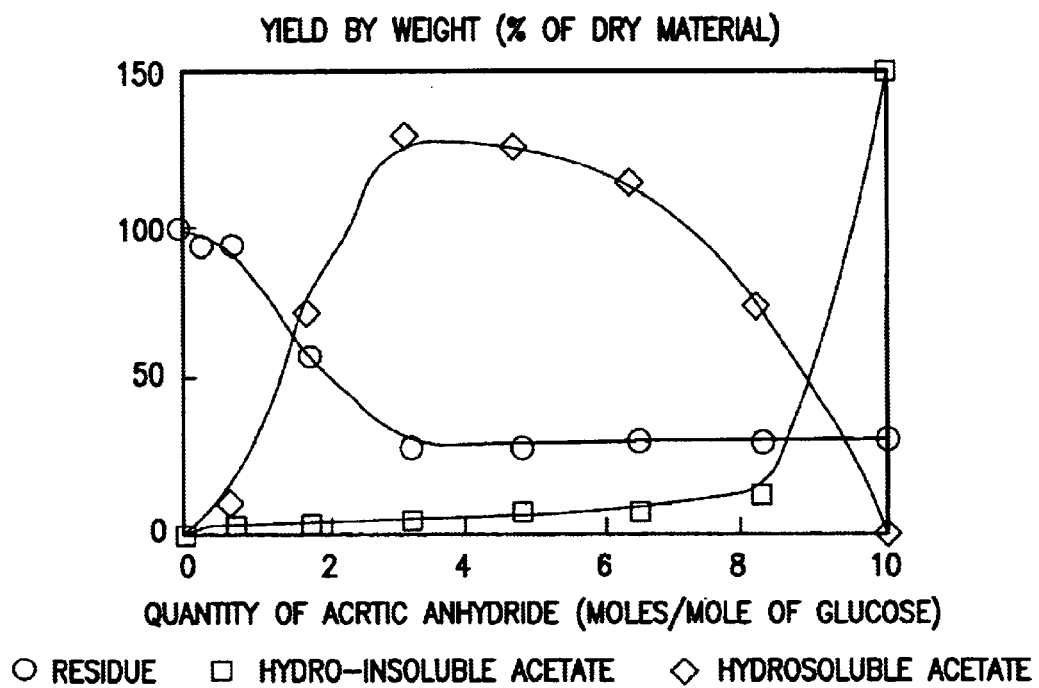

METHOD FOR PRODUCING CELLULOSE SULFOACETATE DERIVATIVES AND PRODUCTS AND MIXTURES THEREOF

The present invention relates to a process for directly obtaining sulfoacetate derivatives as well as the sulfoacetate derivatives which may be obtained with this process.

The cellulose acetates are the most commonly industrially manufactured cellulose derivatives.

Cellulose acetylation is not actually specific and generally only the cellulose triacetates are directly obtained.

Thus, acetylation rate control is not possible in the course of the reaction, which does involve a major problem as it is generally admitted that the solubility and the properties of the resulting derivative are directly related to the cellulose acetylation degree (number of acetylated hydroxyl functions per anhydroglucose unit).

In most techniques according to the prior art, obtaining hydrosoluble cellulose acetate, usually having an acetylation degree within the range from 0.5 to 1, goes through the formation of a cellulose triacetate followed by hydrolysis of the acetyl groups, for example, according to Tanghe L. J. et al. (1963): "Cellulose acetate" in Methods in Carbohydrate Chemistry. Vol. 3, Whistler R. L. (ed.) 193–212, Academic Press, New York or according to Samios E. et al. (1997): "Preparation, characterization and biodegradation studies on cellulose acetates with varying degrees of substitution", Polym., 38 (12): 3045–3054. Said deacetylation may further be performed by methanolysis, for example, according to Buchanan C. M., (1991): "Preparation and characterization of cellulose monoacetates: the relationship between structure and water solubility", Macromol., 24: 3060–3064.

These prior methods involve a considerable extra cost—time, reactive consumption—which excludes contemplating a commercialisaton of hydrosoluble cellulose acetates. Moreover, during the acetylation and deacetylation steps, a strong depolymerization of these derivatives occurs, which affects their rheological properties.

Indeed, according to Aikhodzhaev B. I., et al. (1982): "Preparation and study of the properties of primary soluble cellulose acetates with low degree of substitution", it would be possible to prepare hydrosoluble cellulose acetate directly. But this teaching does not mention anything about the production of sulphated derivatives and the described operational conditions seem to lead to a strong depolymerization of cellulose due to the presence of sulphuric acid in a considerable quantity.

The present invention, as far it is concerned, aims at offering a process for directly producing hydrosoluble sulphated cellulose acetate derivatives in that it does not include a preliminary deacetylation step of cellulose triacetates and this, practically, with no depolymerization of the cellulose chain.

More particular, the invention relates to a process for producing hydrosoluble sulphated cellulose acetate derivatives with a polymerization degree equal to at least 0.8 times that of the initial cellulose.

The present invention also relates to cellulose sulfoacetates adapted to be obtained through such a process and which have more particularly the following advantages and/or features:

variable acetylation degrees, depending on the origin of the cellulose of the starting cellulose material, a sulphation degree ranging from 0.6 to 0.2 (depending on the reaction length), being approximately 0.3 in the generally used reaction conditions, a controlled polymerization degree, an excellent solubility in water and polar solvents, and advantageous rheological properties due to their high viscosity, similar to those of associative polymers, a water retention in the presence of salt: they swell up to 190 ml/g, but remain soluble.

Figure 2:
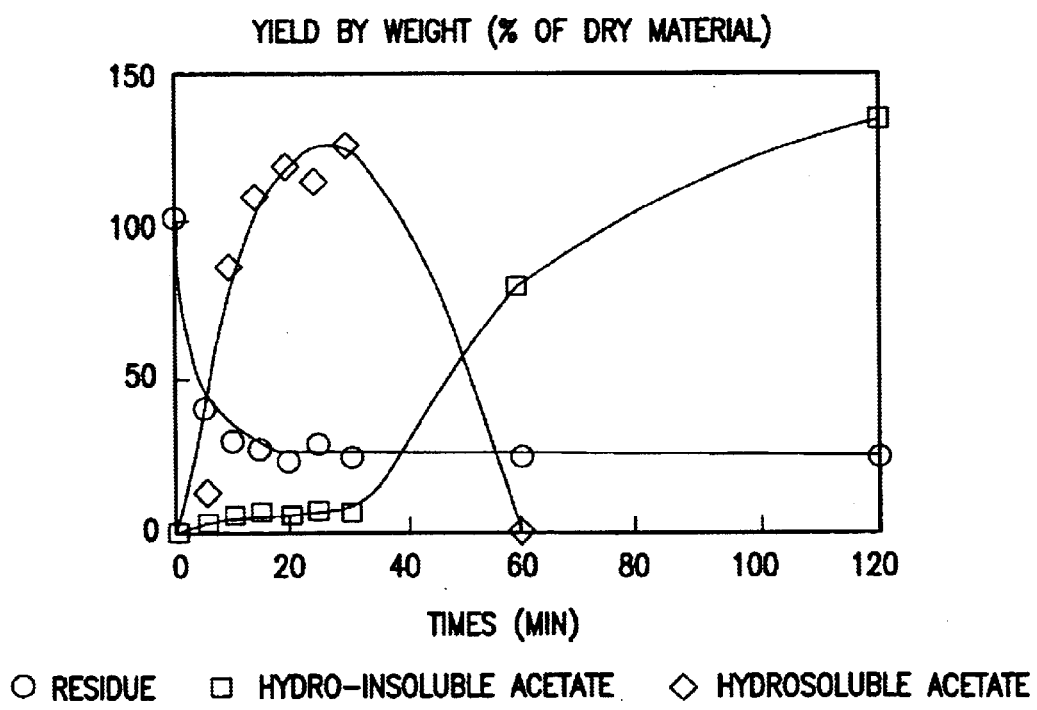

The present invention will now be described more in detail as far as its objects and other features are concerned, and making use of examples given merely by way of illustration and not of limitation, referring to the accompanying drawing in which:

FIG. 1 shows a diagram illustrating an optimization example of the acetic anhydride quantity (in mols of acetic anhydride per mol of anhydroglucose) for an esterification time of 30 minutes, and FIG. 2 shows a diagram illustrating an optimization example of the cellulose esterification time for an acetic anhydride quantity of 3.2 mols/mol of anhydroglucose.

The present invention more precisely aims at offering a process for directly producing a blend of hydrosoluble cellulose sulfoacetate derivatives through esterification of a cellulose material, characterized in that it involves the steps comprising:

(i) suspending the cellulose material in a glacial acetic acid solution and eliminating the acetic acid excess, (ii) suspending the cellulose material swollen with acetic acid in a sulphuric acid solution in the glacial acetic acid, and (iii) reacting the cellulose material by adding the acetic anhydride.

Preferably, the process according to the invention comprises a step (iv) during which the reaction in step (iii) is stopped by adding an aqueous solution of acetic acid.

According to a preferred embodiment, the process according to the invention comprises the steps of:

(v) optionally centrifuging the blend of the above-mentioned step (iv), (vi) washing and eliminating the optionally obtained culot, (vii) adding water in order to precipitate the optionally generated cellulose triacetates, (viii) centrifuging and eliminating the residue, (ix) neutralizing the supernatant by optionally cooling, (x) dialyzing the resulting precipitate, and (xi) freeze-drying the solution.

In such an embodiment, advantageously at step (vi) the optionally obtain residue is washed three times with acetic acid, and then three times with deionized water.

It is also preferable to put, at step (vii), the blend at a temperature within the range from 4 to 25° C., preferably about 4° C., for a period of time ranging from 1 to 24 hours, preferably about 16 hours.

Still in this embodiment, it is preferred that the step (ix) be performed by a slow addition of a sodium hydroxide solution until a pH of about 7.5 is reached.

Similarly, advantageously this same step (ix) will also be carried out by cooling the blend in an ice bath and to follow the pH continuously so that the pH does not exceed 10, preferably about 7.5.

According to another also preferred embodiment, step (x) of the process according to the present invention may be replaced by several washings with ethanolic solutions advantageously made of 60%, 70%, 80% and 100% ethanol. Step (xi) is then replaced by a drying step of the resulting precipitate, the temperature ranging from about 20° C. to about 60° C., preferably about 40° C.

According to the invention, the method moreover shows the complementary and/or alternative following features:

the chosen acetic anhydride quantity ranges from 3 to 7 mols/mol of anhydroglucose, preferably about 3,2 mols/mol of anhydroglucose, the chosen esterification time ranges from 1 to 60 minutes, preferably about 20 to 30 minutes, the chosen esterification temperature ranges from 25° C. to about 80%, preferably about 40° C., the starting cellulose material is selected in the group comprising purified cellulose residues from co-products derived from agriculture and more particularly, from cereal bran, for example wheat and corn, but also from wood cellulose, for example pine-tree . . . , or from commercially-available microcrystalline cellulose of Avicel cellulose type, for example. The process according to the invention thus shows its feasibility on different cellulose sources and thus of various purities, containing notably from 60% to 100% cellulose, in the case where the cellulose originates from cereal bran, the starting cellulose material is subjected to a preliminary acidic or basic treatment for extracting non cellulose polymers; more preferably, said preliminary treatment is performed in the presence of a reducing agent such as sodium borohydride.

The present invention also aims at a blend of hydrosoluble cellulose sulfoacetate derivatives likely to be obtained with the process according to the invention and characterized in that said derivatives have an acetylation degree ranging preferably from 1.5 to about 2.4. The acetyl groups of the sulfoacetates probably take part in inter-chain interactions able to increase the viscosity in a very large extent.

Preferably the sulfoacetate derivatives according to the present invention have a sulphation degree ranging from about 0.2 to about 0.6, preferably about 0.3.

The sulfoacetate derivatives according to the invention also show the following complementary and/or alternative features and/or advantages:

only the carbon atom which is in position 6 of the anhydroglucose cycles of said derivatives is sulphated; thus, the sulphates increase the cellulose hydrophilic character and tend to make the derivative hydrosoluble, said derivatives are obtained from cellulose having a viscosimetric mean polymerization degree determined in cupric ethylene diamine at 25° C. ranging from 210 to 1 590, the intrinsic viscosity of the blend of said derivatives, determined by extrapolation at a nil concentration of the reduced viscosity measured in water at 25° C. ranges from about 600 to about 1 500 ml/g and comparable to that of carboxymethylcellulose, said derivatives have water retention properties such that in the presence of salts, they swell up to 200 ml/g but remain insoluble, the blend of said derivatives is free from triacetylated derivatives which have been eliminated in the course of the process, said derivatives are thermally stable for 16 hours at 80° C., despite the presence of the sulphate groups, the blend of said derivatives may have the form of a thermoreversible and partially thixotropic gel.

EXAMPLE 1

Preparation of Cellulose Sulfoacetates 1.1. Starting Cellulose

The different cellulose have been obtained from a wheat bran, a corn bran and a commercially-available cellulose (Avicel cellulose, sold by Fluka). In table I hereunder, two brans are described which have been subjected to various non cellulosic polymer extraction treatments (heteroxylans and lignin) through an acidic or basic process. The conditions are described hereunder.

1.1.1. Obtention of the cellulose residues 1.1.1.1. Operating Mode 1

Wheat bran is suspended (50 g/l) in a sulphuric acid solution (0.5 mol/l) in the presence of a few octanol drops. The suspension is stirred for 12 hours at 110° C. in an oil bath and at reflux. The residue is recovered by filtration (porosity <15 μm) and is washed with deionized water until the wash water pH reaches 5. The cellulose residue is finally washed with ethanol (3 times, 500 ml), and then with acetone (3 times, 500 ml) and finally dried in a drying-room ventilated at 40° C. for 16 hours.

1.1.1.2. Operating Mode 2

The starting wheat bran or the one treated by sulphuric acid (operating mode 1) is stirred and heated in deionized water (67 g/l) until the temperature reaches 70° C. The glacial acetic acid (12 ml/l) and the sodium chlorite monohydrate (17 g/l) are then added. After 1 hour at 70° C., the same quantity of glacial acetic acid and sodium chlorite is added and the blend is stirred for 1 hour. The residue is recovered by filtration (porosity <15 μm) and washed with deionized water until the wash water pH reaches 5. The delignified residue is then washed with ethanol (3 times, 500 ml), and then with acetone (3 times, 500 ml) and finally dried in a drying-room at 40° C. for 16 hours.

1.1.1.3. Operating Mode 3

Brans are suspended in a potassium hydroxide solution, 1.5 mol/l for corn bran and 2 mol/l for wheat bran. The suspension is maintained at 100° C. for 2 hours with a periodic manual stirring. The residue is recovered after centrifugation (15 000 g, 30 minutes) and is washed with deionized water (3 times, 600 ml). The pH is adjusted at 6 with glacial acetic acid and the residue is washed wit 95% ethanol (3 times, 500 ml), and then with acetone (3 times, 500 ml), and is finally dried in a drying-room ventilated at 40° C. for 16 hours. The residue is then crushed and sieved (particle diameter <0.5 mm).

1.1.1.4. Operating Mode 4

The brans are suspended in a potassium hydroxide solution, 1.5 mol/l for corn bran and 2 mols/l for wheat bran, to which 10 g/l sodium borohydride are added. The suspension is maintained at 100° C. for 2 hours with periodic manual stirring. The residue is recovered after centrifugation (15 000 g, 30 minutes) and is washed with deionized water (3 times, 600 ml). The pH is adjusted at 6 with glacial acetic acid and the residue is washed with ethanol at 95% (3 times, 500 ml), followed by acetone (3 times, 500 ml) and is finally dried in a drying-room ventilated at 40° C. for 16 hours. The residue is then crushed and sieved (particle diameter <0.5mm).

1.1.1.5. Operating Mode 5

The brans are suspended (100 g/l) in a potassium hydroxide solution, 1.5 mol/l for corn bran and 2 mol/l for wheat bran, to which are added in a known way 10 ml/l of 130 volume hydrogen peroxide. The suspension is maintained at 100° C. for 2 hours with a periodic manual stirring. The residue is recovered after centrifugation (15 000 g, 30 minutes) and is washed with deionized water (3 times, 600 ml). The pH is adjusted at 6 with glacial acetic acid and the residue is washed with ethanol at 95% (3 times, 500 ml), and then with acetone (3 times, 500 ml) and is finally dried in a drying-room ventilated at 40° C. for 16 hours. The residue is then crushed and sieved (particle diameter <0.5 mm).

TABLE I

Extraction treatments for non cellulose polymers (heteroxylans and lignin) of wheat and corn brans

| Cellulose source | Sample | Operating mode | Treatment |
|---|---|---|---|
| Wheat bran | 1 | 1 + 2 | Sulphuric acid, then sodium chlorite |
| | 2 | 2 + 3 | Sodium chlorite, then potassium hydroxide |
| | 3 | 2 + 4 | Sodium chlorite, then potassium hydroxide + sodium borohydride |
| Corn bran | 4 | 4 | Potassium hydroxide + sodium borohydride |
| | 5 | 5 | Potassium hydroxide + hydrogen peroxide |
| Avicel cellulose (Fuka) | 6 | — | Commercial cellulose |

These conditions lead to samples having features that can be very different as to the composition and the length of the cellulose chains (Table II).

TABLE II

Yield (mg/g), composition (mg/g), viscosimetric mean polymerization degree ($DP_v$) and crystallinity (C) of the cellulose samples

| Sample | Yield | Non cellulosic oses | Cellulose | Ashes | Lignin | $DP_v$ | C |
|---|---|---|---|---|---|---|---|
| 1 | 217 | 134 | 581 | 1 | 132 | 270 | Weak |
| 2 | 201 | 282 | 554 | 26 | 7 | 940 | Weak |
| 3 | 208 | 299 | 587 | 25 | 6 | 1150 | Weak |
| 4 | 224 | 279 | 603 | 29 | 7 | 1250 | Weak |
| 5 | 157 | 184 | 729 | 13 | 8 | 720 | Weak |
| 6 | — | Trace | 974 | 0 | 0 | 210 | Strong |

Non cellulosic oses=heteroxylans (arabinose+xylose+galactose+glucuronic acid)+mannose+non cellulosic glucose $DP_v$=viscosimetric mean polymerization degree determined in a continuous way in cupric ethylene diamine at 25° C.

C (crystallinity)=determined by X ray diffraction (selected wave length $\lambda_{Cu}K_{al}$=0.15405).

AS FIG. 1 shows, the acetic anhydride quantity added to a cellulose residue should be lower than about 2 to 7 mols per mol of anhydroglucose and, preferably, about 3.2 mols per mol of anhydroglucose. Lower acetic anhydride quantities do not allow any esterification in the conditions indicated in FIG. 1 (time: 30 minutes, temperature: 40° C.) and higher quantities lead to the formation of a cellulose triacetate.

FIG. 2 shows that the reaction time should be below 1 hour and preferably of about 20 to 30 minutes in the conditions indicated in FIG. 2 (temperature and reactive quantity). For a reaction time superior or equal to about 1 hour, the esterification produces cellulose triacetate.

Both figures illustrate the production of an esterification residue which is rich in non cellulose polymers. This residue is not obtained for high purity celluloses.

1.2. Obtention of Cellulose Sulfoacetates 1.2.1. Optimization of the Obtention Conditions The cellulose sulfoacetates are obtained according to the protocol described later. Two reaction temperatures have been tested: 25° C. and 40° C. At 25° C., no reaction is observed. The influence of the acetic anhydride quantity and of the reaction time has been studied at 40° C. (see FIGS. 1 and 2).

As FIG. 1 shows, the acetic anhydride quantity added to a cellulose residue should be lower than about 2 to 7 mols per mol of anhydroglucose and, preferably, about 3.2 mols per mol of anhydroglucose. Lower acetic anhydride quantities do not allow any esterification in the conditions indicated in FIG. 1 (time: 30 minutes, temperature: 40° C.) and higher quantities lead to the formation of a cellulose triacetate.

FIG. 2 shows that the reaction time should be below 1 hour and preferably of about 20 to 30 minutes in the conditions indicated in FIG. 2 (temperature and reactive quantity). For a reaction time superior or equal to about 1 hour, the esterification produces cellulose triacetate.

Both figures illustrate the production of an esterification residue which is rich in non cellulose polymers. This residue is not obtained for high purity celluloses.

1.2.1. Operational Mode

The cellulose material, obtained as indicated hereabove, is suspended in an acetic acid solution (50 g/l), and then left under magnetic stirring for 15 minutes at room temperature. After centrifugation (2 250 g, 10 minutes, 20° C.), the supernatant is eliminated. This step is repeated twice.

The cellulose (50 g/l) is then dipped at room temperature into an acetic acid and sulphuric acid solution (12 g/l) and the whole is thoroughly stirred for 1 minute at room temperature.

The acetic anhydride (3.2 mols per mol of anhydroglucose) is added and the reaction blend is thoroughly stirred for 1 minute, and then placed under rotating stirring at 40° C. for 30 minutes.

The reaction is stopped by adding a 70% acetic acid solution in order to eliminate the excess acetic anhydride and the blend is stirred for 30 minutes at room temperature.

After centrifugation (2 250 g, 10 minutes, 35° C.), the supernatant is recovered and the residue is washed three times with acetic acid, followed by three times with deionized water.

The acetic acid and the wash waters are added to the supernatant.

Deionized water (4 volumes) is placed in a centrifugation tube and the cellulose ester solution is slowly added under magnetic stirring. The blend is placed at 4° C. for 16 hours in order to precipitate the (optionally generated cellulose triacetates.

The supernatant is recovered by centrifugation (17 500 g, 20 minutes, 4° C.), and then neutralized at pH 7.5, by a slow sodium hydroxide addition at 4 mol/l.

The blend is cooled in an ice bath and the pH is continuously observed in order to avoid any saponification.

The resulting precipitate is then dialyzed against deionized water until the conductivity of the dialysis waters is lower than 1 $\mu$S/cm.

1.3. Results

At 40° C., the acetic anhydride quantities may range from 3 to 7 mols per mol of anhydroglucose when the reaction time is equal to 30 minutes. The yields are optimal for a period of time ranging from about 20 minutes to about 30 minutes, when the acetic anhydride quantity is equal to 3.2 mols per mol of anhydroglucose.

The influence of the sulphuric acid quantity has not been tested. The sulphuric acid quantity probably influences the sulphation rate and hence the water solubility. Besides, too high sulphuric acid quantities can cause a depolymerization of the cellulose and thereby affect the rheological properties of the resulting derivatives.

The esterification yield is high, but depends on the cellulose purity (Table III). It varies around 1.3 g/g for cellulose residues obtained from cereals brans—the cellulose content of which ranges between 550 and 730 mg/g and reaches 1.7 g/g for commercial cellulose.

The acetylation degrees range from 1.8 to 2.4 and the sulphation degree is usually 0.3 (except for sample 2, where it is equal to 0.4).

TABLE III

Esterification yield (g/g), cellulose content (mg/g), acetylation (DA) and sulphation (DS) degrees, inrinsic viscosity (ml/g) and crystallinity of the cellulose sulfoacetates according to the invention as a function of the starting cellulose

| Sample | Esterification yield | Cellulose | DA | DS | [η] | Crystallinity |
|---|---|---|---|---|---|---|
| 1 | 1.3 | 364 | 2.0 | 0.3 | nd | Nil |
| 2 | 1.2 | 408 | 2.4 | 0.4 | 1534 | Nil |
| 3 | 1.2 | 434 | 1.9 | 0.3 | 768 | Nil |
| 4 | 1.2 | 443 | 1.8 | 0.3 | 637 | Nil |
| 5 | 1.3 | 445 | 1.8 | 0.3 | 642 | Nil |
| 6 | 1.7 | 531 | 2.3 | 0.3 | 1470 | nil |

$\eta$ = intrinsic viscosity in water at 25° C. Flow measures in an Ubbelhode type capillar tube (diameter: 0.52) have been performed at different concentrations. The intrinsic viscosity is then determined by nil concentration extrapolation of the reduced viscosity.
Nd = not measured.

The absence of cellulose depolymerization during the esterification reaction has been shown for sample 6 (table III): the derivative polymerization degree is therefore the same as that of the starting cellulose. This ranges from 210 to 1 250 for samples 1 to 6 (table II) and it does not seem to affect the esterification yields and the cellulose derivative properties.

1.4. Properties of the Cellulose Sulfoacetates According to the Invention

The solubility in water and polar solvents is related to the presence of the sulphates which make the polymers sufficiently hydrophilic, as already mentioned.

Moreover, the acetyls confer to the derivatives of the present invention their interesting associative properties: high intrinsic viscosity depending on the acetylation degree (table III). The high intrinsic viscosity (650–1 500 ml/g) comparable to that of the carboxymethylcellulose implies potentially interesting thickening properties.

EXAMPLE 2

Obtention of Thermoreversible Gels Based on the Cellulose Sulfoacetates of the Invention Other interesting properties conferred to the derivatives of the invention by the acetyl groups include thixotropy and gelification after thermal treatment.

The solubilization should preferably be hot performed in order to obtain a clear solution at a temperature from about 25° C. to about 100° C., preferably at approximately 80° C. For a 20 mg/ml concentration and after solubilization at 80° C. and slow cooling, for example a decrease of 1° C./mn to reach 20° C., a weak gel is obtained, characterized by the value of modulus G' and G" (respectively storing and loss modulus) which are respectively 550 and 80 Pa at 1rad/s and by applying a 5% deformation amplitude. This gel is stronger, i.e. having higher G' and G" module values and the divergence between the modulus is higher when the concentration is high and the temperature decrease is slow. For concentrations ranging from about 10 to about 20 mg/ml, the resulting concentration is very viscous (G' ranging from 10 and 60 Pa at 1 rad/s and G" ranging from 0.5 and 5 Pa at 1 rad/s). For concentrations lower than about 10 mg/ml, a little viscous solution is obtained.

2.1. Properties of Cellulose Sulfoacetate Gels

The cellulose sulfoacetate gels according to the invention are thermoreversible (no loss of the rheological properties is observed after a thermal treatment) and partially thixotropic (the gel destruction when applying a shear is not irreversible and after some rest, it tends to recover its initial state).

Thermal treatments do not cause sulphuric ester link degradation. There is therefore no sulphuric acid release which could, in the course of time, hydrolyze the polymer.

According to the present description, the expression "glacial acetic acid" should be understood as meaning acetic acid that is substantially pure at 100%.

We claim:

1. Process for directly producing a blend of water soluble cellulose sulfoacetates through esterification of a cellulose, comprising the steps of:
   (i) suspending the cellulose in a solution containing glacial acetic acid and eliminating the excess acetic acid,
   (ii) suspending the cellulose swollen with acetic acid from step (i) in a mixture of sulphuric acid solution and glacial acetic acid, and
   (iii) reacting the cellulose by adding the acetic anhydride, characterized in that:
      the acetic anhydride quantity is about 3.2 mols/mol of anhydroglucose,
      the esterification time ranges from 1 to 60 minutes, and
      the esterification temperature is about 40° C.

2. Process according to claim 1, characterized in that it comprises a step (iv) in which the reaction of step (iii) is stopped by adding an aqueous solution of acetic acid.

3. Process according to claim 2, characterized in that it comprises the steps of:
   v) adding water in order to precipitate any cellulose triacetates that are generated,
   (vi) centrifuging, recovering the supernatant and eliminating the residue,
   (vii) neutralizing the supernatant,
   (viii) dialyzing the resulting precipitate, and
   (ix) freeze-drying the solution.

4. Process according to claim 3, characterized in that the step (vii), is carried out by a slow addition of a sodium hydroxide solution until a pH of about 7.5 is reached.

5. Process according to claim 3, characterized in that at the step (vii) the blend is cooled in an ice bath and the pH is continuously monitored so that the pH does not exceed 10.

6. Process according to claim 5, characterized in that the pH does not exceed 7.5.

7. Process according to claim 1, characterized in that the esterification time ranges from 20 to 30 minutes.

8. Blend of hydrosoluble cellulose sulfoacetates obtained by performing a process according to claim 1, characterized in that said sulfoacetates have an acetylation degree ranging from 1.5 to 2.4.

9. Blend according to claim 8, characterized in that said blend has a sulphation degree ranging from 0.2 to 0.6.

10. Blend according to claim 9, characterized in that said blend has a sulphation degree of 0.3.

11. Blend according to claim 8, characterized in that only the carbon atom which is in position 6 of the anhydroglucose is sulphated.

12. Blend according to claim 8, characterized in that said blend has a viscosimetric mean polymerization degree determined in cupric ethylene diamine at 25° C. ranging from 210 to 1590.

13. Blend according to claim 10, characterized in that said blend intrinsic viscosity, determined by extrapolation at nil concentration of the reduced viscosity measured in water at 25° C. ranges from 600 to 1500 ml/g.

14. Blend according to claim 8, characterized in that it is free from triacetylated cellulose.

15. Blend according to claim 8, characterized in that said blend is thermally stable for 16 hours at 80° C.

16. Blend according to claim 8, characterized in that it has the form of a thermoreversible and partially thixotropic gel.

17. The process according to claim 3, wherein said process further comprises, before step (v), the following steps:
- (a) centrifuging the blend obtained in step (iv), and recovering the centrifugation supernatant; and
- (b) washing the residue obtained from centrifugation in step (a) with acetic acid, then with water, and then adding the acetic acid and the water resulting from the washing steps to the supernatant which was recovered in step (a).

\* \* \* \* \*